(12) United States Patent
Pawlowski et al.

(10) Patent No.: US 11,325,206 B2
(45) Date of Patent: May 10, 2022

(54) ADDITIVE MANUFACTURED INTERPENETRATING PHASE COMPOSITE

(71) Applicant: UT-Battelle, LLC, Oak Ridge, TN (US)

(72) Inventors: Alex E. Pawlowski, Oak Ridge, TN (US); Amit Shyam, Knoxville, TN (US); Derek A. Splitter, Knoxville, TN (US); Amelia M. Elliott, Oak Ridge, TN (US); Zachary C. Cordero, Houston, TX (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 273 days.

(21) Appl. No.: 16/389,280

(22) Filed: Apr. 19, 2019

(65) Prior Publication Data

US 2019/0321915 A1    Oct. 24, 2019

Related U.S. Application Data

(60) Provisional application No. 62/660,371, filed on Apr. 20, 2018.

(51) Int. Cl.
*B23K 26/34* (2014.01)
*B23K 26/354* (2014.01)
(Continued)

(52) U.S. Cl.
CPC .............. *B23K 26/34* (2013.01); *B22F 3/11* (2013.01); *B22F 3/1115* (2013.01); *B22F 3/26* (2013.01);
(Continued)

(58) Field of Classification Search
CPC .... B22F 3/26; B22F 7/002; B22F 3/24; B22F 2007/045; B22F 5/10; B22F 3/11;
(Continued)

(56) References Cited

U.S. PATENT DOCUMENTS

| | | | | | |
|---|---|---|---|---|---|
| 5,394,930 | A | * | 3/1995 | Kennerknecht | ........ B22D 19/14 164/112 |
| 2002/0189405 | A1 | * | 12/2002 | Liu | ........................ B22F 7/00 75/767 |

(Continued)

OTHER PUBLICATIONS

Wang, Q. G., et al. "Fatigue behavior of A356-T6 aluminum cast alloys. Part I. Effect of casting defects." Journal of light metals 1, No. 1 (2001): 73-84. (Year: 2001).*

(Continued)

*Primary Examiner* — Ibrahime A Abraham
*Assistant Examiner* — Simpson A Chen
(74) *Attorney, Agent, or Firm* — Warner Norcross + Judd LLP (57) ABSTRACT

A method for preparing metal/metal interpenetrating phase composites is provided. The method includes forming a preform using additive manufacturing. The preform defines a materially continuous three-dimensional open-cell mesh structure. The preform includes a first metal having a melting point. The method further includes pre-heating the preform to a first temperature less than the melting point of the first metal. The method includes infiltrating the preform with a second metal in liquid form. The second metal has a melting point lower than the melting point of the first metal. The method also includes allowing the second metal to cool and form a solid matrix. The solid matrix defines a continuous material network.

18 Claims, 5 Drawing Sheets

(51) Int. Cl.
  B33Y 70/00    (2020.01)
  B33Y 10/00    (2015.01)
  C22C 33/02    (2006.01)
  C22C 1/04     (2006.01)
  B22F 3/11     (2006.01)
  B22F 3/26     (2006.01)
  B22F 3/24     (2006.01)
  B22D 19/00    (2006.01)
  B22F 7/00     (2006.01)
  B22F 7/04     (2006.01)
  B22F 5/10     (2006.01)
  C22C 21/00    (2006.01)
  C22C 33/00    (2006.01)

(52) U.S. Cl.
  CPC ............ B23K 26/354 (2015.10); B33Y 10/00 (2014.12); B33Y 70/00 (2014.12); C22C 1/0475 (2013.01); C22C 33/0242 (2013.01); *B22D 19/00* (2013.01); *B22F 3/24* (2013.01); *B22F 5/10* (2013.01); *B22F 7/002* (2013.01); *B22F 2007/045* (2013.01); *C22C 21/00* (2013.01); *C22C 33/00* (2013.01)

(58) Field of Classification Search
  CPC . B22F 3/1115; B22F 3/1118; B22F 2007/066; C22C 33/0242; C22C 1/0475; C22C 21/00; C22C 33/00; C22C 33/02; B22D 19/02; B22D 19/00; B23K 26/34; B23K 26/354; B33Y 10/00; B33Y 70/00
  USPC ...................................................... 219/121.66
  See application file for complete search history.

(56)  References Cited

U.S. PATENT DOCUMENTS

| | | | |
|---|---|---|---|
| 2012/0215310 A1* | 8/2012 | Sharp | B33Y 10/00 623/11.11 |
| 2015/0283614 A1* | 10/2015 | Wu | B22F 3/12 419/42 |
| 2016/0221083 A1* | 8/2016 | Tuffile | B33Y 10/00 |
| 2017/0107764 A1* | 4/2017 | Cook, III | B23K 26/342 |
| 2018/0027914 A1* | 2/2018 | Cook | A42B 3/124 |
| 2019/0009464 A1* | 1/2019 | Steege | B33Y 10/00 |
| 2019/0170444 A1* | 6/2019 | Magee | F28F 9/16 |
| 2020/0023584 A1* | 1/2020 | Portela | B29C 64/30 |

OTHER PUBLICATIONS

Maskery, Ian, et al. "A mechanical property evaluation of graded density Al—Si10—Mg lattice structures manufactured by selective laser melting." Materials Science and Engineering: A 670 (2016): 264-274. (Year: 2016).*

* cited by examiner

ADDITIVE MANUFACTURED INTERPENETRATING PHASE COMPOSITE

CROSS-REFERENCE TO RELATED APPLICATION

This application claims the benefit of U.S. Provisional Application 62/660,371, filed Apr. 20, 2018, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to methods for preparing metal/metal interpenetrating phase composites, more specifically the invention relates to methods for preparing metal/metal interpenetrating phase composites including forming a preform using additive manufacturing and infiltrating the preform with a liquid metal.

Various additive manufacturing processes use a high-power laser or electron-beam to fuse a feedstock, layer-by-layer, into a bulk product. These processes can print complex objects that are difficult or impossible to fabricate using traditional manufacturing techniques. Examples of additively manufactured components include lightweight robotic components and advanced orthopedic implants.

Additive manufacturing processes can be used to print metal/metal interpenetrating phase composites and functionally graded parts. Previously, these composites and parts have been prepared by changing composition of a feedstock during printing. This approach suffers from low printing resolution and from the creation of brittle intermetallics. The intermetallics, once formed, can subsequently crack due to thermal stresses generated by a heat source used in an additive manufacturing process.

Therefore, there remains a continued need for an improved method for preparing metal/metal interpenetrating phase composites that can overcome the limitations of previous additive manufacturing-based processes. In particular, there remains a need for a high-resolution method for preparing metal/metal interpenetrating phase composites that does not include the creation of brittle intermetallics and allows for the manufacture of functionally graded parts.

SUMMARY OF THE INVENTION

A method for preparing metal/metal interpenetrating phase composites is provided. The method includes forming a preform using additive manufacturing. The preform defines a materially continuous three-dimensional open-cell mesh structure. The preform includes a first metal having a melting point. The method further includes pre-heating the preform to a first temperature less than the melting point of the first metal. The method includes infiltrating the preform with a second metal in liquid form. The second metal has a melting point lower than the melting point of the first metal. The method also includes allowing the second metal to cool and form a solid matrix. The solid matrix defines a continuous material network.

A further embodiment of the method for preparing metal/metal interpenetrating phase composites is provided. The further embodiment includes selecting a preform geometry including a continuous three-dimensional open-cell mesh. The method includes preparing a print file encoding the preform geometry. The method further includes using the print file to print a preform having the preform geometry using an additive manufacturing device. The preform includes a first metal having a melting point. The method also includes preheating the preform to a first temperature less than the melting point of the first metal. The method further includes infiltrating the preform with a second metal in liquid form. The second metal has a melting point lower than the melting point of the first metal.

The method of the present invention therefore provides for preparing metal/metal interpenetrating phase composites. The method can overcome challenges associated with fusion-based additive manufacturing processes wherein local control over composition is achieved by changing the composition of a feedstock during printing. For example, the method provides for higher resolution (on the order of 100 µm) for patterning components of a metal/metal interpenetrating phase composite. Also, the method overcomes a challenge inherent in fusion-based additive manufacturing processes wherein feedstock materials can react and form brittle intermetallics that can crack due to thermal stresses generated by a heat source during printing. The method further provides for an improved method for tailoring the physical/mechanical properties of a metal/metal interpenetrating phase composite on both global and local scales.

BRIEF DESCRIPTION OF THE DRAWINGS

Other advantages of the present disclosure will be readily appreciated, as the same becomes better understood by reference to the following detailed description when considered in connection with the accompanying drawings, wherein.

DETAILED DESCRIPTION OF THE CURRENT EMBODIMENT

Figure 1:
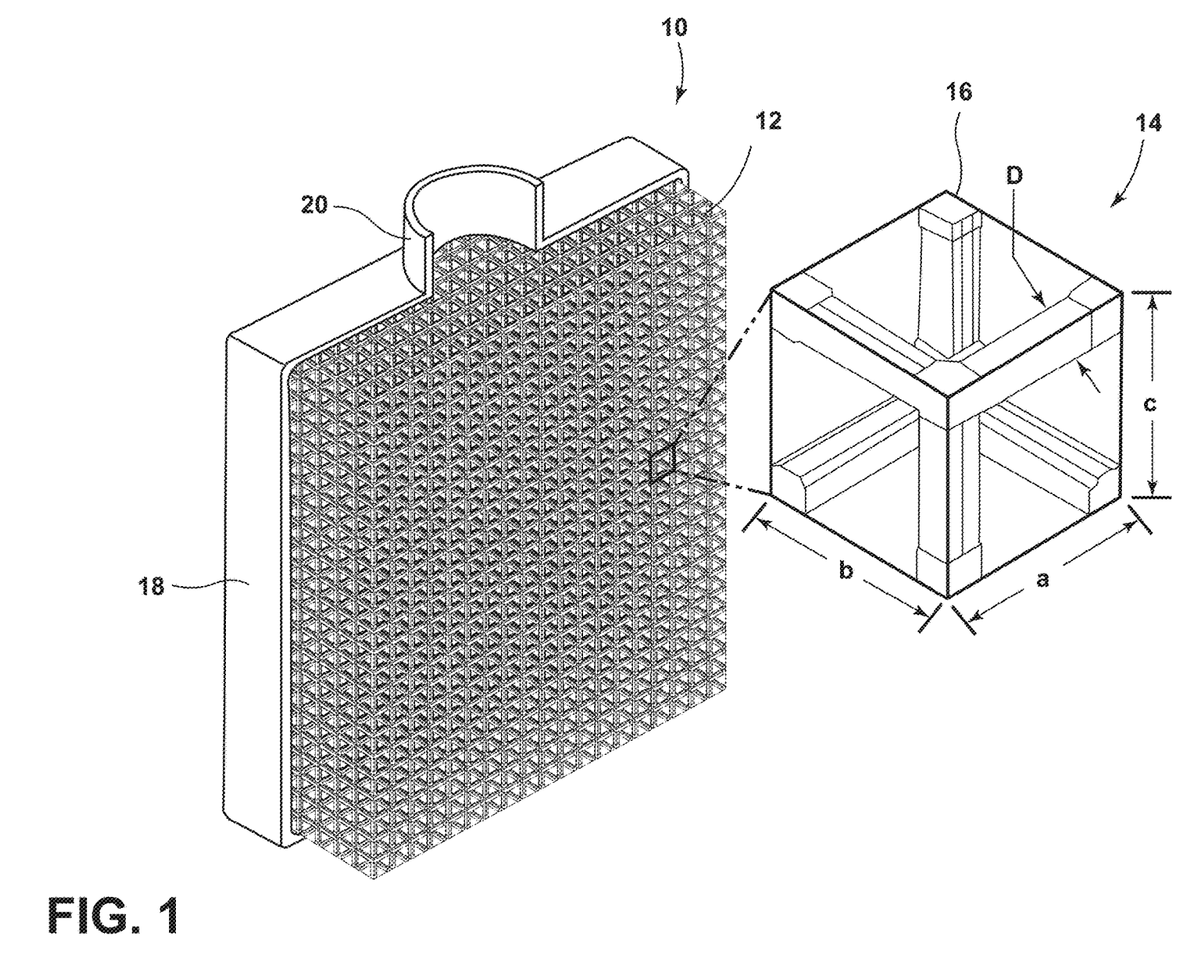
FIG. 1 shows a perspective view of a preform and an expanded view of a unit cell of a lattice defined by the preform.

A method for preparing a metal/metal interpenetrating phase composite is provided. The method includes selecting a preform geometry. A preform having a selected geometry is shown in FIG. 1 and generally designated as 10. In various embodiments selecting the preform geometry 10 includes drawing the preform geometry 10 using computer aided design (CAD) software. The preform geometry 10 (where "preform" and "preform geometry" are distinguished in that a preform is a preform geometry that has been printed using additive manufacturing) includes a continuous three-dimensional open-cell mesh 12. The preform geometry 10 is printed using additive manufacturing, as described further below, to yield a materially continuous three-dimensional open-cell mesh structure 12 having the preform geometry 10 (i.e., a preform 10).

In various embodiments, the three-dimensional open-cell mesh 12 defines a lattice 12. The lattice 12 includes a plurality of repeating unit cells 14. The unit cells 14 can have any of a variety of unit cell 14 symmetries known in the art, such as body-centered cubic symmetry. The unit cells 14 can conform to myriad three-dimensional shapes including cubic, octet truss, tetragonal, orthorhombic, monoclinic, hexagonal, trigonal, and triclinic. In various embodiments, the lattice 12 defines a stretch-dominated lattice or a bending-dominated lattice. For example, a lattice 12 consisting of unit cells 14 having body-centered cubic symmetry is a bending-dominated lattice whereas a lattice 12 comprising of unit cells 14 having an octet-truss configuration is a stretch-dominated lattice. The unit cells 14 include major dimensions a, b, and c as shown in FIG. 1. Any one or a multitude of the major dimensions a, b, and/or c of the unit cells 14 can vary or remain constant as a function of position within the three-dimensional open-cell mesh 12.

Figure 3:
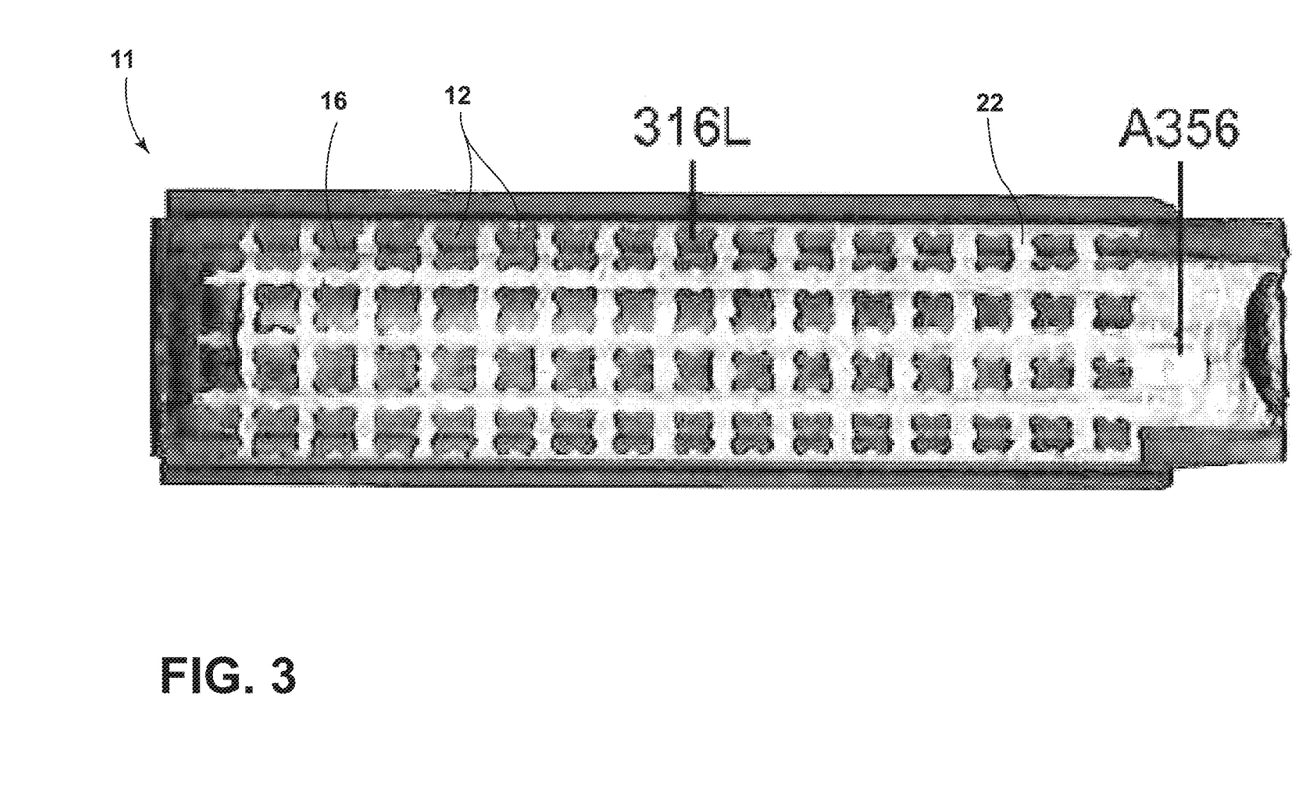
FIG. 3 shows a cross-section of a metal/metal interpenetrating phase composite manufactured using a functionally-graded preform.
Figure 4:
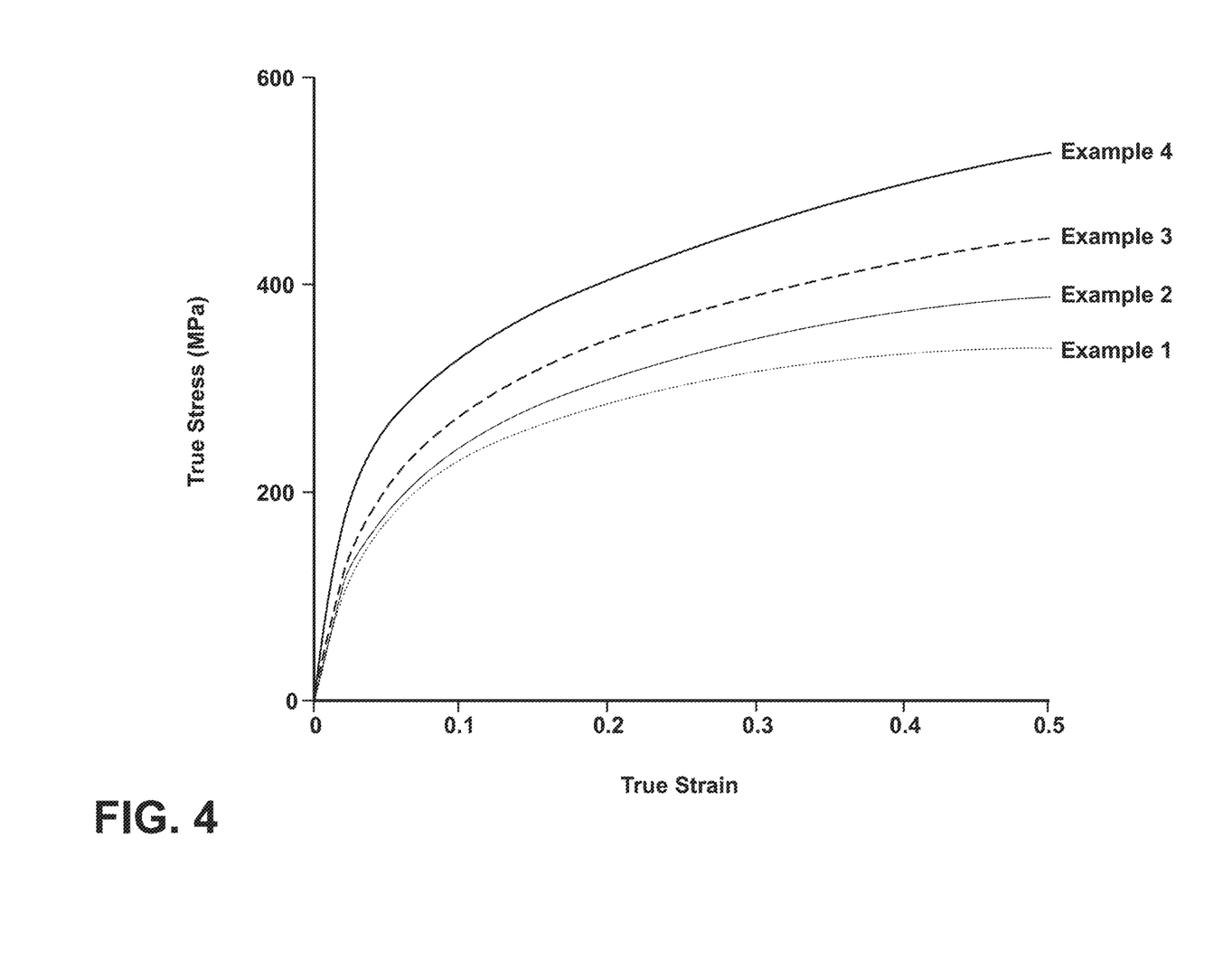
FIG. 4 shows stress-strain curves from compression tests on metal/metal interpenetrating phase composites including different volume fractions of 316L.

The three-dimensional open-cell mesh 12 includes struts 16. The struts 16 include a diameter D. In various embodiments D is from about 0.25 mm to about 2 mm, from about 0.5 to about 1.5 mm, or from about 0.7 to about 1 mm. A cross-section of the struts 16 can conform to myriad shapes including square, circular, rectangular, or any of various polyhedra. The cross-section of the struts 16 may vary as a function of position within the preform 10. In various embodiments, the cross-section of the struts 16 is dendritic in shape. The cross-section of the struts 16 in various embodiments conforms to an X-shape. All or a sub-set of edges of a unit cells 14 may be traversed by a strut 16. For example, as shown in FIG. 1, six edges of a unit cell 14 are traversed by struts 16. In various embodiments, D can vary as a function of position within the three-dimensional open-cell mesh 12. For example, D decreases from left to right along a major dimension of a lattice 12 depicted in FIG. 3. Thus, the preform 10 can include struts 16 where strut diameter D decreases along a major dimension of the preform 10.

Preforms 10 including three-dimensional open-cell mesh structures 12 defining a lattice 12 where a, b, c, or D, or any combination thereof, varies as a function of position may be referred to as functionally-graded preforms or as preforms imparting position/function-optimized mechanical/structural properties to a composite 11. Such functionally-graded preforms can be used to prepare metal/metal interpenetrating phase composites 11 with function/position-optimized mechanical/structural properties.

In various embodiments the preform geometry 10 includes a skin 18 either partially or fully encapsulating the three-dimensional open-cell mesh 12. The skin 18 can define an in-gate 20 to be used during infiltration (alternatively referred to as casting), as described further below. The skin 18 includes a thickness optionally from around 0.25 mm to around 2 mm, from around 0.5 to about 1.5 mm, or of about 1 mm.

The method further includes preparing a print file encoding the preform geometry 10. The print file encodes the preform geometry 10 in a format that can be interpreted by an additive manufacturing device allowing for the additive manufacturing device to print the preform geometry 10 to produce a preform 10. Thus, in various embodiments the method includes using the print file to print the preform 10 using additive manufacturing.

Any of various additive manufacturing devices known in the art can be used as the additive manufacturing device in the method. For example, devices using metal additive manufacturing techniques such as direct metal deposition, selective laser melting, or electron-beam additive manufacturing may be used. Various materials may be used as a feedstock for the additive manufacturing device. For example, a gas-atomized 316L powder feedstock (Fe-18Cr-12Ni-2Mo, wt %) may be used or any of various metals or alloys or metal or alloy powders that may be used as feedstocks in additive manufacturing. Thus, the preform 10 may be manufactured of 316L or any of various metals or alloys compatible as feedstocks for use with the additive manufacturing device used in the method (the metal or alloy used to manufacture the preform 10 may be referred to as a "first metal").

In various embodiments, the method further includes at least partially encapsulating the preform 10 with a suitable material, such as plaster of Paris. The purpose of encapsulating the preform 10 with the suitable material is to ensure that the preform 10 is prepared for being infiltrated with liquid metal, as described below. The preform 10 does not require structural reinforcement prior to infiltration because the preform 10 includes a full three-dimensional open-cell mesh that is dense and is near net shape.

The method includes pre-heating the preform 10 to a first temperature less than the melting point of the first metal. The first temperature is optionally equal to 70% of a melting point of a second metal, or, optionally, around 700° C. The first temperature is less than a melting point of the first metal. The second metal is optionally A356 (Al-7.6Si-0.25Mg-0.2Fe, wt %) or any of various metals or alloys known in the art. The second metal has a melting point that is less than the melting point of the first metal.

The method further includes infiltrating the preform 10 with the second metal while the second metal is in liquid form. Any casting technique known in the art can be used to infiltrate the preform 10 with the liquid second metal; for example, spring-driven centrifugal casting may be used. When the preform 10 includes an in-gate 20 the second metal can be added to the preform 10 through the in-gate 20.

Following infiltration, the second metal is allowed to cool and form a solid matrix 22. The solid matrix 22 and the three-dimensional open-cell mesh structure 16 interpenetrate one another. The solid matrix 22 defines a continuous material network. The three-dimensional open-cell mesh structure 16 also defines a continuous material network. Together the solid matrix 22 and the three-dimensional open-cell mesh 16 comprise the metal/metal interpenetrating phase composite 11. The method can include removing the skin 18. The skin 18 can be removed by face milling.

In various embodiments, a gap 26 separates the first metal from the second metal in the metal/metal interpenetrating phase composite 11. The gap 26 can be from about 10 μm to about 100 μm, from about 25 μm to about 75 μm, or about 50 μm.

In various embodiments the metal/metal interpenetrating phase composite 11 has a strain to failure that is greater than a strain to failure of the second metal. In various embodiments the strain to failure of the metal/metal interpenetrating phase composite 11 is about 2 times, 5 times, or 10 times (an order of magnitude) greater than the strain to failure of the second metal. In various embodiments the metal/metal interpenetrating phase composite 11 has a 0.2% offset yield strength, $\sigma_y$, of from about 100 MPA to about 400 MPA, or from about 125 MPA to around 300 MPA. In various embodiments, the metal/metal interpenetrating phase composite 11 has a strain hardening exponent, n, of from about 0.2 to about 0.5, from about 0.25 to about 0.4, or of from about 0.26 to about 0.35.

In various embodiments the metal/metal interpenetrating phase composite 11 includes pores 24 and has a porosity. The porosity, as measured by optical microscopy, is optionally from around 0% to around 10%, from around 0 to around 7%, or from around 0 to around 6%. In various embodiments the metal/metal interpenetrating phase composite 11 has a specific gravity of from 3 to 8, from 4 to 7, or from 4.1 to 6. Specific gravity is calculated by independently measuring mass and volume. A volume fraction of the first metal in the metal/metal interpenetrating phase composite 11 can be from around 0.1 to about 0.7, from about 0.2 to about 0.6, or from about 0.25 to about 0.55.

III. Examples

The following examples, illustrating the methods of this disclosure, are intended to illustrate and not to limit the disclosure.

Figure 2:
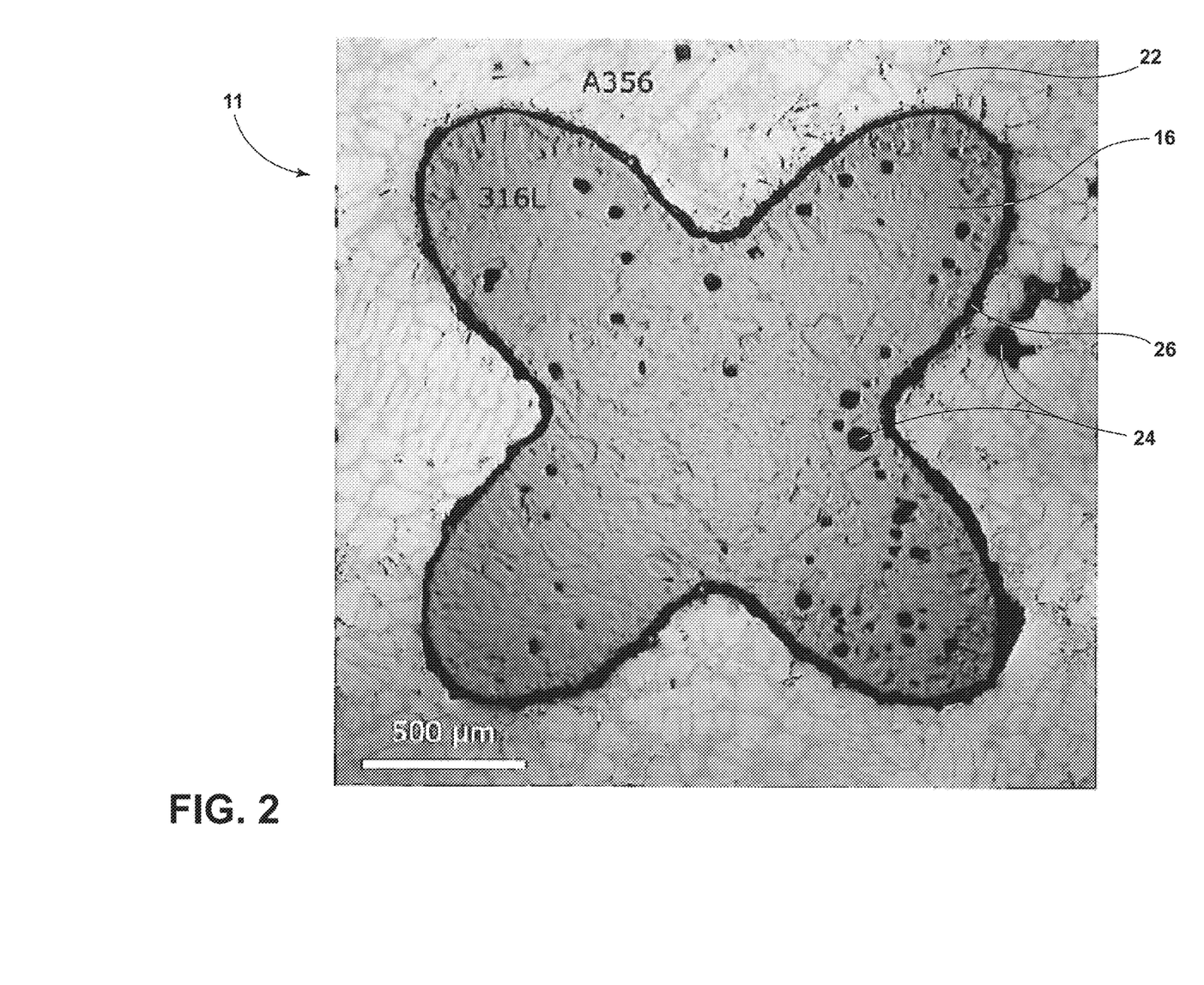
FIG. 2 is an optical image of a section of a metal/metal interpenetrating phase composite.

A356/316L interpenetrating phase composites are prepared in two main steps. First, preforms are fabricated using a Renishaw AM250 selective laser melting system with gas-atomized 316L powder feedstock. Second, the preforms are mounted in plaster of Paris, pre-heated to 700° C., and infiltrated with molten (alternatively referred to as liquid) A356 using a spring-driven centrifugal casting machine. The preforms consist of an open-cell mesh structure encapsulated by a 1 mm thick skin. The skin serves as both in-gate and mold during infiltration. The A356 and 316L phases of the composites are separated by a 50 μm gap, as shown in FIG. 2. No intermetallics are formed in the composites. The gap indicates poor bonding between 316L and A356, which may improve toughness of the composites.

The preforms include a lattice having body-centered cubic symmetry. A lattice region of the preforms has dimensions 40 mm×40 mm×13.5 mm. Composites with different volume fractions of 316L are fabricated by infiltrating preforms having the same unit cell size (a=b=c=2.5 mm) but different strut diameters (D). Compositional, physical, and structural properties of the composites are provided in Table 1, where $\sigma_y$ is 0.2% offset yield strength, and n is strain hardening exponent.

|   | Volume fraction 316 L | Strut diameter, D (mm) | Specific Gravity | Porosity (%) | $\sigma_y$ (MPa) | n |
|---|---|---|---|---|---|---|
| Example 1 | 0.29 | 0.72 | 4.10 ± 0.05 | 5.7 ± 0.2 | 140 | 0.26 |
| Example 2 | 0.39 | 0.83 | 4.61 ± 0.05 | 6.9 ± 0.2 | 150 | 0.31 |
| Example 3 | 0.46 | 0.91 | 4.95 ± 0.05 | 6.7 ± 0.2 | 155 | 0.33 |
| Example 4 | 0.54 | 0.99 | 5.67 ± 0.05 | 4.1 ± 0.2 | 250 | 0.32 |

Mechanical test specimens are harvested from the composites including compression test specimens and tension test specimens. The mechanical properties of the composites are evaluate using uniaxial compression and tension tests performed on a servo-hydraulic MTS 312.21 that is operated under displacement control. The compression test specimens are cylindrical with a 15 mm height and a 10 mm diameter. The tension test specimens are round and have an 18 mm gauge length and a 45 mm gauge diameter.

Figure 5:
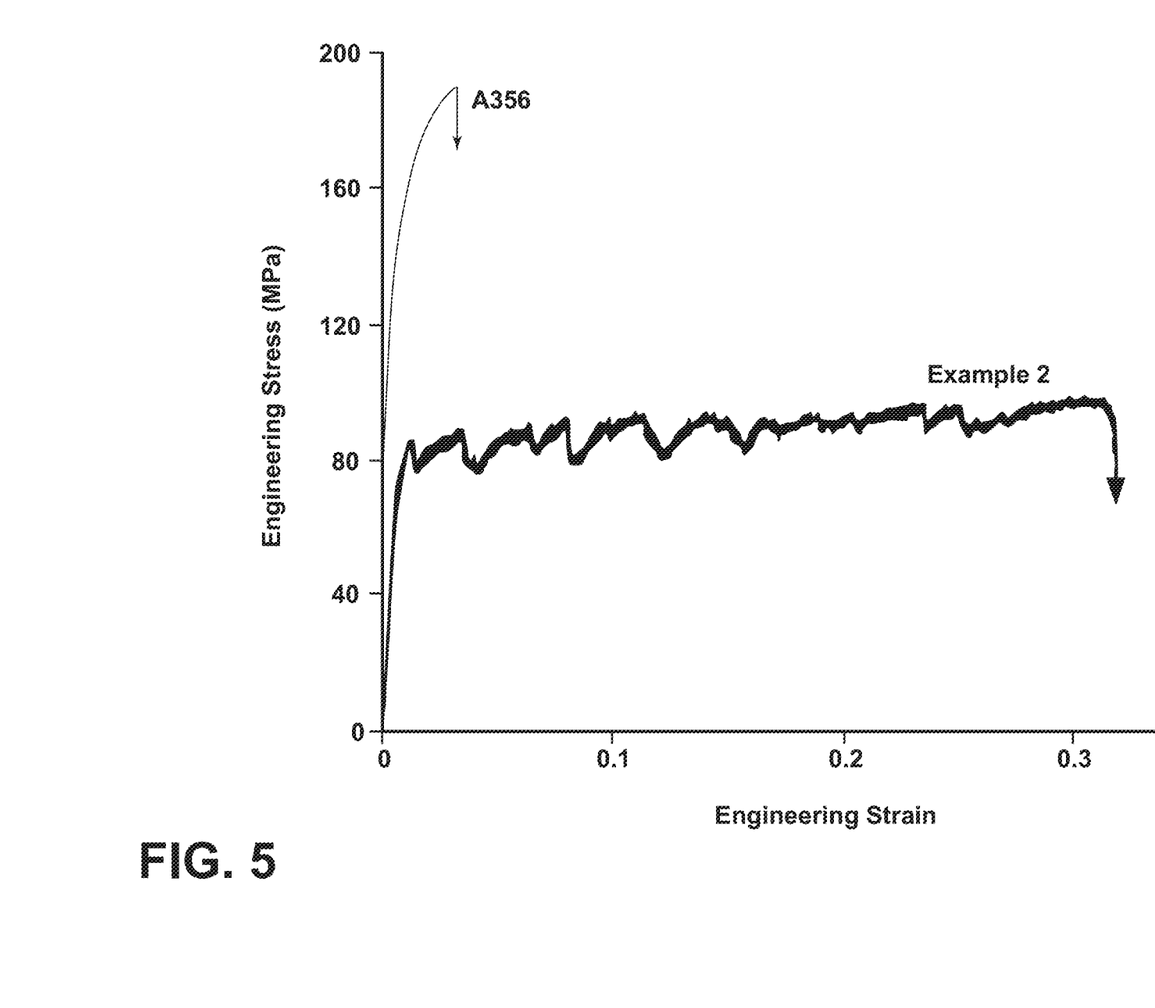
FIG. 5 shows stress-strain curves from tension tests on a metal/metal interpenetrating phase composite and monolithic A356 and further shows a perspective image of a representative sample used in tests to prepare the stress-strain curves.

Compression test specimens are subjected to an initial strain rate of around $5\times10^{-5}s^{-1}$. Compression strain is measured with an extensometer affixed to platens. For comparison purposes, compression tests are also performed on comparative compression test specimens consisting of fully-dense 316L cylinders prepared by selective laser melting and on comparative compression test specimens consisting of A356 samples harvested from an as-cast ingot. FIG. 5 shows compressive true stress-strain curves for Example 1-4 compression test specimens. The stress-strain curves shown in FIG. 5 demonstrate that volume fraction can be adjusted to achieve specific mechanical properties. Observed deformation patterns, comparisons between theoretical and actual stress-strain curves for the composites, and actual stress-strain curves for the 316L cylinders and the A356 samples are all consistent with a potential to achieve specific mechanical properties also by adjusting geometry (alternatively, topology) of the lattice.

Tension test specimens are subjected to an initial strain rate of $3\times10^{-4}s^{-1}$, and the tensile strain is measured using a clip-on extensometer. For comparison purposes, tension tests are also performed on tension test specimens consisting of A356 and harvested from an as-cast ingot. FIG. 6 shows a tension stress-strain curve for an Example 2 tension test specimen and for a monolithic A356 test specimen (A356 in FIG. 5). The strain to failure of the monolithic A356 test specimen is 3% and the total strain to failure of the Example 2 test specimen is 32% at an ultimate tensile strength of 95 MPa.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. The technology disclosed and claimed herein may be available for licensing in specific fields of use by the assignee of record.

The invention claimed is:

1. A method for preparing metal/metal interpenetrating phase composites, the method comprising:
    forming a preform using additive manufacturing, the preform defining a materially continuous three-dimensional open-cell mesh structure and an outer skin, wherein the open-cell mesh structure includes a plurality of interconnected struts that define a plurality of repeating unit cells each defining a void therein, wherein the outer skin at least partially encapsulates the open-cell mesh structure and includes a base, a sidewall, a top wall, and an ingate extending upwardly from the top wall, the ingate being cylindrical and centrally disposed along the top wall, wherein the base, the sidewall, and the top wall collectively define a mold cavity, wherein the ingate is in fluid communication with the mold cavity, and wherein the preform includes a first metal having a melting point;

pre-heating the preform to a first temperature less than the melting point of the first metal;

infiltrating the open-cell mesh structure of the preform with a second metal in liquid form by flowing the second metal through the ingate, such that the second metal occupies the voids in the plurality of repeating unit cells and contacts an interior surface of the base and an interior surface of the sidewall, such that the base and the sidewall retain the second metal within the mold cavity, the second metal having a melting point lower than the melting point of the first metal;

allowing the second metal to cool within the mold cavity and form a solid matrix, wherein the solid matrix defines a continuous material network; and removing the outer skin from the solid matrix, wherein the solid matrix encapsulates the plurality of interconnected struts to yield a metal/metal interpenetrating phase composite, further defining an intermetallic-free gap between the solid matrix and the plurality of interconnected struts to improve toughness of the metal/metal interpenetrating phase composite, wherein the first metal is 316L and the second metal is A356.

2. The method of claim 1, wherein the metal/metal interpenetrating phase composite has a strain to failure that is greater than a strain to failure of the second metal.

3. The method of claim 2, wherein the strain to failure of the metal/metal interpenetrating phase composite is an order of magnitude higher than the strain to failure of the second metal.

4. The method of claim 1, wherein the skin has a thickness of from 0.5 to 1.5 mm.

5. The method of claim 1, wherein the three-dimensional open-cell mesh structure defines a-body-centered cubic symmetry.

6. The method of claim 1, wherein the three-dimensional open-cell mesh structure defines a stretch-dominated lattice.

7. The method of claim 1, wherein the three-dimensional open-cell mesh structure defines a bending-dominated lattice.

8. The method of claim 1, wherein the preform is a functionally-graded preform, wherein a geometry of the three-dimensional open-cell mesh structure varies as a function of position within the preform.

9. The method of claim 8, wherein the plurality of struts each have a strut diameter wherein strut diameter decreases along a major dimension of the preform.

10. The method of claim 1, wherein the plurality of struts include a cross-section conforming to a dendritic shape.

11. A method for preparing metal/metal interpenetrating phase composites, the method comprising:

selecting a preform geometry including a continuous three-dimensional open-cell mesh structure and an outer skin, wherein the open-cell mesh structure includes a plurality of interconnected struts that define a plurality of repeating unit cells each defining a void therein, wherein the outer skin at least partially encapsulates the open-cell mesh structure and includes a base, a sidewall, a top wall, and an ingate extending upwardly from the top wall, the ingate being cylindrical and centrally disposed along the top wall, wherein the base, the sidewall, and the top wall collectively define a mold;

preparing a print file encoding the preform geometry;

using the print file to print a preform having the preform geometry using an additive manufacturing device, wherein the preform comprises a first metal having a melting point;

preheating the preform to a first temperature less than the melting point of the first metal;

infiltrating the open-mesh structure of the preform with a second metal in liquid form by flowing the second metal through the ingate, the second metal having a melting point lower than the melting point of the first metal, such that the second metal occupies the voids in the plurality of repeating unit cells and contacts an interior surface of the base and an interior surface of the sidewall, such that the base and the sidewall retain the second metal within the mold cavity;

allowing the second metal to cool within the mold cavity and form a solid matrix, wherein the solid matrix defines a continuous material network; and removing the outer skin from the solid matrix, wherein the solid matrix encapsulates the plurality of interconnected struts to yield a metal/metal interpenetrating phase composite, further defining an intermetallic-free gap between the solid matrix and the plurality of interconnected struts to improve toughness of the metal/metal interpenetrating phase composite, wherein the first metal is 316L and the second metal is A356.

12. The method of claim 11, wherein the additive manufacturing device prints using selective laser melting.

13. The method of claim 11, wherein the metal/metal interpenetrating phase composite has a porosity of from 0% to 10%.

14. The method of claim 11, wherein the metal/metal interpenetrating phase composite has a 0.2% offset yield strength, $\sigma_y$ of from 100 MPa to 300 MPa.

15. The method of claim 11 further comprising mounting the preform in plaster.

16. The method of claim 11, wherein the metal/metal interpenetrating phase composite has a specific gravity of from 4 to 6.

17. The method of claim 11, wherein the struts have a diameter of from 0.5 mm to 1 mm.

18. The method of claim 11, wherein a volume fraction of the first metal in the metal/metal interpenetrating phase composite is from 0.25 to 0.55.

* * * * *